United States Patent Office 2,767,168
Patented Oct. 16, 1956

2,767,168

PURIFICATION OF STREPTOMYCIN

Lee C. Cheney, Fayetteville, N. Y., assignor to Bristol Laboratories Inc., Syracuse, N. Y., a corporation of New York No Drawing. Application February 20, 1953,
Serial No. 338,129

4 Claims. (Cl. 260—210)

This invention relates to a new class of organic chemicals useful in therapeutics and in the manufacture of streptomycins and, more particularly, to new 1,3-substituted-2-streptomycyl-tetrahydroimidazoles and their non-toxic salts.

Throughout this specification and claims, the names "streptomycyl" and "hydroxystreptomycyl" are used to represent the radicals attached to the aldehyde group

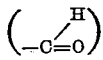

in the widely-known antibiotics streptomycin and hydroxystreptomycin. Thus, the antibiotic streptomycin is represented by the formula "Streptomycyl-CHO" or as "Strep.-CHO" (see U. S. Patent #2,607,770) rather than by the customary formula. An ordinary salt, such as the sulfate, is represented as "Streptomycyl-CHO·1½H₂SO₄"

or as "2 Streptomycyl-CHO·3H₂SO₄."

Up to the present time, there have not been available any active, non-toxic salts or forms or derivatives of streptomycin which are relatively insoluble in water. In chemical production, this means that elaborate processes, such as those using ion-exchange columns, are required to concentrate a solution of crude streptomycin. Final crystallization is a complex and expensive process using large amounts of organic solvents and generally also requiring formation of a calcium-chloride double salt before a satisfactory crystalline sulfate can be prepared. Illustrative processes are given by U. S. Patents #2,446,102, 2,541,420, and 2,578,840. Expensive toxic dyes are used by Regna; see U. S. Patents #2,555,762, 2,555,763, 2,560,889, 2,560,890, 2,555,761, 2,555,760.

A further disadvantage of known salts and derivatives of streptomycin and the free base is their instability under alkaline conditions, which irreversibly decompose and inactivate the streptomycin, forming the gamma-pyrone, maltol.

In therapeutic use, present water-soluble salts and derivatives of streptomycin and the free base are rapidly absorbed when administered by injection, e. g. intramuscularly, and do not give protracted blood levels. They are also absorbed very poorly upon oral administration. In the treatment of tuberculosis, prolonged high concentrations of streptomycin are not necessary and in addition increase the possibilities of neurotoxic reactions (Antibiotic Therapy, Welch and Lewis, Arundel Press, Washington, D. C., 1951, page 104). A repository preparation giving prolonged but not too high blood levels is therefore desired to overcome these objectives and to spare the patient and physician the inconvenience and expense of numerous injections.

It is an object of the present invention to provide a new series of derivatives of streptomycin and hydroxy-streptomycin and their acid addition salts, which are non-toxic, therapeutically effective, relatively insoluble in water, stable in aqueous alkali and easily regenerated by aqueous acid to the original soluble, active streptomycin.

It is a further object of the present invention to provide improved processes for the isolation and purification, as from inorganic and ash-forming impurities, of streptomycin from crude, aqueous solutions.

It is a further object of the present invention to provide a new series of derivatives of streptomycin and hydroxystreptomycin and their non-toxic acid addition salts which upon parenteral administration in suitable media provide prolonged blood levels and prolonged therapeutic action.

It is an additional object of the present invention to provide a new series of derivatives of streptomycin and hydroxy-streptomycin and their non-toxic acid addition salts which are systematically absorbed and effective upon oral or buccal, e. g. sublingual, administration.

The objects of this invention have been achieved and there is now discovered, according to the present invention, the new series of compounds selected from the group consisting of compounds having the formula (a)
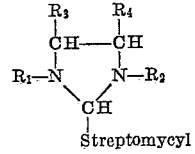
Streptomycyl wherein R₁ and R₂ represent radicals selected from the group consisting of alkyl, cyclopentyl, cyclopentyl-lower alkyl, cyclohexyl, cyclohexyl-lower alkyl, lower alkyl-cyclohexyl-lower alkyl, lower akoxy-cycohexyl-lower alkyl, lower alkyl-cyclohexyl, lower alkoxy-cyclohexyl, dehydroabietyl, pyridyl, lower alkyl-pyridyl, thiophene-lower alkyl, lower alkyl-thiophene-lower alkyl, furan-lower alkyl, lower alkyl-furan-lower alkyl, quinolyl-lower alkyl, naphthyl, benzhydryl, piperonyl, thiazolyl, phenyl, lower alkyl-phenyl-lower alkyl, phenyl-lower alkyl, halo-phenyl-lower alkyl, nitrophenyl-lower alkyl, hydroxy-phenyl-lower alkyl, H₂N-phenyl-lower alkyl, lower alkoxy-phenyl-lower alkyl, alkoxy-hydroxy-phenyl-lower alkyl, and di-lower alkyl-monohydroxy-phenyl-lower alkyl; R₃ and R₄ are members selected from the group consisting of hydrogen and methyl; and (b) acid addition salts thereof.

The products of the present invention are useful, non-toxic therapeutic agents in diseases of man and animals caused by streptomycin-sensitive tuberculosis bacteria and gram-negative bacteria and are useful as growth-stimulating supplements for animals and poultry, as in feeds, and for use to stimulate the growth of plants, such as radishes, oats and grass.

Further, as illustrated in detail below, the products of the present invention are of particular value in the commercial production of streptomycin because, by virtue of their very low solubility in water and other solvents, they provide improved means for isolation and purification of streptomycin from impurities, e. g. ash-forming impurities.

The products of the present invention are further useful for their ability to provide prolonged, therapeutic blood-levels upon parenteral injection in comparison with the non-toxic streptomycin salts of the prior art.

The products of the present invention are prepared by the reaction of hydroxystreptomycin free base, streptomycin free base or water-soluble acid addition salts thereof, and I prefer streptomycin sulfate, with an equimolar quantity, or more, of an N,N'-substituted-α,β-diamino-alkane, where there are two to four carbon atoms in the alkane carbon chain. Two examples are N,N'-dibenzyl-ethylenediamine and N-p-methylbenzyl-N'-benzyl-1,2-di-aminopropane. I prefer to conduct the reaction in water but can also use a mixture of water and a water-miscible organic solvent such as methanol or acetone when desired, e. g. to solubilize the amine. The reaction takes place at room temperature over a period varying from several hours to several days but can be accelerated by heating, e. g. to 50° C. for twenty minutes. The mixture needs to be maintained at a pH of about 7.0 or higher, since acid conditions reverse the reaction and regenerate the starting reagents. The product precipitates as a solid or as an oil which solidifies on seeding. The product may be purified of unreacted streptomycin reagent, i. e. sulfate, by slurrying with water.

Brief heating in aqueous acid regenerates the starting materials and often precipitates the diamine salt, e. g. N,N'-dibenzylethylenediamine hydrochloride. The purified streptomycin can be recovered in the usual ways, as by lyophilization or by crystallization of the sulfate by the addition of alcohol.

This invention also includes all acid addition salts for processing purposes and all non-toxic acid addition salts for therapeutic purposes, organic and inorganic examples of which include hydrochloric, sulfuric, sulfamic, tartaric, hydrobromic, hydriodic, glycolic, citric, maleic, phosphoric, succinic, acetic, benzoic, cinnamic, mandelic, malic, ascorbic, and the like. I prefer the sulfate.

When the imidazoles of the present invention are used for therapeutic purposes, they may be used in water with a suspending agent such as sodium carboxymethylcellulose, Spans, Tweens, lecithin or pectin or in injectable oils, e. g. peanut oil gelled with aluminum monostearate in a manner analogous to the art pertaining to insoluble salts of penicillin. If desired, suspending or dispensing agents may be added to increase pharmaceutical elegance. As a suspending or dispersing agent, sodium carboxymethylcellulose has been found highly satisfactory but carboxymethylcellulose, methylcellulose, polyvinyl alcohol, polyvinylpyrrolidone, gum tragacanth, gelatin, pectin, sodium alginates, dextran, gum Karaya, the copolymer of methyl vinyl ether and maleic anhydride, and the like, are also useful. The amount of suspending agent will vary to a certain extent, but usually from about 0.2 to 5.0 percent, preferably from 0.5 to 2.5 percent, is employed and variations within these ranges may be made by any experienced chemist or pharmacist with regard to the intended use of the composition. Thus the concentration of polyvinylpyrrolidone may vary from 0.1% to 25%, with about 10% preferred. The concentration of dextran may vary from 0.1% to 20%, with about 10% preferred. The concentration of pectin may vary from 0.1% to 0.5%, with about 0.2% preferred. The concentration of gum tragacanth may vary from 0.5% to 2% with about 1% preferred; 5% sodium chloride may be added thereto.

It is to be understood that the words "suspending agent" and "dispersing agent" are used interchangeably to describe the additives such as sodium carboxymethylcellulose, lecithin, Spans and Tweens which improve the pharmaceutical elegance of these preparations, as by increasing ease of injection and ease of resuspension upon settling. Other suspending and dispersing agents include lecithin, Falba, cholesterol, Span 20, Span 40, Span 60, Span 80, the Tweens, Amerchols, sodium alginate, potassium alginate, ammonium alginate, calcium alginate, alginic acid, propylene glycol alginate, polyoxyalkylene derivatives of sorbitol fatty acid esters, urea and sodium p-aminobenzote.

The composition is not limited to the exact ingredients previously described and to the exclusion of all others, since various other ingredients, while not necessary, may be added, if desired. For instance, a small amount of preservative, such as Phenol U. S. P., Cresol U. S. P., Methyl Paraben (methyl ester of p-hydroxybenzoic acid), Ethyl Paraben (ethyl ester of p-hydroxybenzoic acid), Butyl Paraben (butyl ester of p-hydroxybenzoic acid) or Propyl Paraben (propyl ester of p-hydroxybenzoic acid) may be employed. Other ingredients which improve blood levels, handling properties and stability may be added. Examples of such ingredients are lecithin, Falba, cholesterol, Span 20, Span 40, Span 60, Span 80, Tween 20, Tween 40, Tween 60, Tween 80, Tween 85, Amerchols, urea, and sodium para-amino-benzoate. The Spans are hexitol anhydride (hexitans and hexides derived from sorbitol (partial esters of common long-chain fatty acids (e. g., lauric, palmitic, stearic, oleic) and the Tweens are polyoxyalkylene derivatives of the Spans.

The diamine reagents of this invention are prepared by the usual synthetic methods. Thus by the reaction of ethylene dichloride with an appropriately substituted amine, substituted ethylene diamines are formed. Alternatively, ethylenediamine or its acid addition salts are reacted with formaldehyde and a suitably substituted compound containing an active hydrogen atom, such as aldehydes, ketones, thiophene, organic acids and the like, whereby N,N'-disubstituted ethylene diamines are obtained. In another method for the preparation of substituted ethylene diamines, a suitably substituted aldehyde or ketone is condensed with ethylene diamine to form the correspondingly substituted diimine. The diimine is hydrogenated by the usual methods, such as catalytic reduction and the like, to give the desired substituted ethylene diamine. Acid addition salts of the substituted ethylene diamines can be prepared by the methods of the art, as, for example, by inter-reaction of equivalent amounts of the substituted diamine base and a selected acid in inert solvent solution, followed by removal of the solvent.

Thus 1,2-bis-(phenylethylamino)ethane is prepared by mixing a solution of 54 g. (0.5 mole) of 1,2-dibromoethane in 250 cc. of ethanol and 242 g. (2 moles) of 2-phenylethylamine. The mixture is boiled for about an hour, made alkaline with potassium hydroxide and boiled for a further 10-minute period. The precipitated potassium bromide is removed, the alcohol is evaporated off and the residue, comprising 1,2-bis-(phenylethylamino)-ethane, is fractionally distilled under pressure. 1,2-bis-(phenylethylamino)ethane boils at about 240° C. at the pressure of 15 mm. of mercury.

Thus, in a 500 ml. three-necked flask, fitted with stirrer, condenser and thermometer, are mixed 42 g. (0.5 mole) of thiophene, 33 g. (0.25 mole) ethylenediamine dihydrochloride and 43 ml. of 36% aqueous formaldehyde. The mixture is stirred and heated to gradually raise the temperature. At 60° C. a vigorous reaction begins, heating is stopped and an ice-bath is applied to the flask. The internal temperature rises to about 73° C. and the reaction mixture solidifies. 200 ml. of 50% aqueous alcohol is added and stirred and the mixture is heated an additional 90 minutes. After cooling, the reaction product is filtered and washed with water. The white product is amorphous and is dissolved in 250 ml. hot water, cooled and made alkaline with 40% sodium hydroxide. The free base which separates is not very soluble in ether and is taken up in benzene, dried over sodium hydroxide and is obtained as a colorless, viscous oil on removing benzene in vacuo. The oil is converted to diacetate by dissolving in 200 ml. ethyl acetate and adding 12 ml. glacial acetic acid. The precipitated N,N'-bis-(2-thenyl)-ethylenediamine diacetate is collected by filtration, washed with ethyl acetate and found to melt at about 84° C.

In essentially the same manner as above, one may also react an alkylene diamine such as ethylenediamine and an acid, as, for example, hydrochloric, sulfuric or formic acid, to form the di-acid salt together with half a mol. of formaldehyde, half a mol. of the following compounds may be reacted therewith to form the corresponding symmetrical di-substituted alkylene diamines: cyclohexanone, 2,3 and 4-methyl-cyclohexanone, 4-methoxy-cyclohexanone, cyclopentanone, 2-methyl-thiophene, isoquinoline, 3-methyl-isoquinoline and quinaldine.

Mixed N,N'-mono-substituted-ethylene diamines may be prepared in the ways known to the art. Thus, to prepare N-benzyl-N'-alpha-ethylbenzyl-ethylenediamine, dimethyl benzylaminoacetal (49 g., 0.25 mol.) and 1-phenylpropylamine (34 g., 0.25 mol.) are mixed in a 500 ml. flask fitted with a reflux condenser with a drying tube. Formic acid (75 ml., 98–100%) is added all at once. A vigorous reaction ensues with darkening and evolution of heat and of carbon dioxide. When the initial vigorous reaction has subsided, the mixture is heated to reflux for two hours and excess formic acid is then removed by distillation under reduced pressure to leave a tarry residue to which is added 150 ml. of 6 N HCl. After heating for reflux for one hour, cooling in an ice-bath and making alkaline by the addition of 40% aqueous sodium hydroxide, the supernatant layer is separated, diluted with 400 ml. ether and filtered to remove tar. The filtrate is dried over sodium hydroxide and treated with methanolic hydrochloric acid to precipitate N-benzyl-N'-alpha-ethylbenzylethylenediamine dihydrochloride, which melts at about 305° C. after recrystallization from aqueous methanol.

Numerous other N,N'-bis-(mono-substituted)ethylenediamines may be prepared according to U. S. Patent #2,627,491. Formation of N-cyclohexyl-N'-ethyl-ethylenediamine is taught by this patent by reaction of acetaldehyde with N-cyclohexyl-ethylenediamine followed by catalytic hydrogenation; N-benzyl-N'-vanillylethylenediamine is prepared by reaction of N-benzylethylenediamine with vanillin followed by reduction with formic acid. In the same patent are disclosed numerous N-monosubstituted-ethylenediamines (e. g. N-heptylethylenediamine) and a general process for their preparation by reaction of an aldehyde (e. g. heptaldehyde) with ethylenediamine diformate. These products can in turn be reacted as their diformates with aldehydes to give diamines of the formula $R_1$—NH—$CH_2$—$CH_2$—NH—$R_2$ where $R_1$ and $R_2$ differ.

This application is a continuation-in-part of copending application Serial No. 327,456 of Buckwalter and Cheney, filed December 22, 1952, directed to the utilization of N,N'-bis-(dehydroabietyl) ethylenediamine as the N,N'-bis-(dehydroabietyl) ethylenediamine dipenicillin G. salt.

Further understanding of the invention may be obtained by reference to the following examples which are illustrative only and are not the exclusive embodiment of the invention. I wish it to be understood that I do not desire to be limited to the exact details shown and described, for obvious modifications will occur to a person skilled in the art.

EXAMPLE I

*1,3-dibenzyl-2-streptomycyltetrahydroimidazole sulfate*

To a solution of 7.3 g. (0.01 mole) of streptomycin sulfate in 50 ml. of water was added 5.4 g. (0.0225 mol) of N,N'-dibenzylethylenediamine in 25 ml. of methanol. Addition of 45 ml. of methanol gave a clear solution. Heating on the steam bath at 45–50° C. for ten minutes caused precipitation of 1,3-dibenzyl-2-streptomycyltetrahydroimidazole sulfate as an oil which crystallized rapidly to a white solid. It was chilled, filtered and air-dried; weight—8.4 g.

The product was slurried for a few minutes with 50 ml. of water to insure removal of all streptomycin sulfate, collected by filtration and air-dried. Weight—7.2 g.; M. P.—243°–247° C. (decomposition, with previous browning); solubility—4980 u./ml. or about 8 mgms./ml.; potency—512 u./mg. (87% of theory).

*Analysis.*—Calculated for $C_{37}H_{57}N_9O_{11} \cdot 1½ H_2SO_4$:

|   | Calculated | Found |
|---|---|---|
| C | 46.7 | 47.4 |
| H | 6.36 | 6.42 |
| N | 13.3 | 12.3 |

A 1.5 g. sample of the imidazole was suspended in 25 ml. of 6 N HCl and heated for three hours at 100° C. The mixture was filtered and the solid product recrystalized from water to give 0.5 g. of N,N'-dibenzylethylenediamine dihydrochloride. M. P.—305°–306° C. (d.). An authentic sample gave M. P. 305°–307° C. (d.). The filtrate contained active, regenerated streptomycin in solution.

EXAMPLE II

The procedure of Example I was repeated with certain variations and the following, tabulated results.

| Conditions and Results | Experiment No. | | |
|---|---|---|---|
|  | Run 1 | Run 2 | Run 3 |
| Moles of Streptomycin Sulfate | 0.005 | 0.01 | 0.01. |
| Potency of Streptomycin Sulfate | 769 u./mgm | 769 u./mgm | 769 u./mgm. |
| Moles of Amine | 0.027 | 0.011 | 0.0225. |
| Grams of Amine | 6.5 | 2.6 | 5.4. |
| Mls. $H_2O$ | 75 | 50 | 50. |
| Mls. MeOH | 95 | 75 | 70. |
| pH | 8 |  |  |
| Yield (grams) | 3.6 | 5.2 | 7.2 [1] |
| M. P. | 245–255° C. (d.) | 249–252° C. (d.) | 243–247° C. (d.). |
| Potency (bio-assay) [2] | 630 u./mgm | 500 u./mgm | 512 u./mgm. |
| Solubility in water of Product [3] |  | 2092 u./ml | 4560 u./ml. |
| Reaction Time | Room temp. for few hours. | Room temp. for 3 days. | 45°–50° C. for 10 minutes; Room temp. 24 hours. |

[1] Product slurried with 50 ml. water to remove unreacted streptomycin sulfate, collected by filtration, air-dried and then weighed and assayed.
[2] The potency of the product was determined on suspensions by bio-assay (*subtilis* and *coli*) due to its insolubility in water, methanol, butanol, ketones, acetonitrile, nitromethane, chloroform, dimethyl formamide and amyl acetate and acetone. The suspensions contained 10 mgms. of finely-ground product per ml. water.
[3] The solubility of the product was determined by shaking at least 0.1 g. of finely ground material in 10 ml. water for hours, filtering the solution which contains much undissolved product and assaying the filtrate (*subtilis* and *coli*).

EXAMPLE III

*1,3-di(β-phenethyl)-2-streptomycyltetrahydroimidazole sulfate*

A solution of 2.7 g (0.01 mole) of N,N'-di(β-phenethyl)ethylenediamine in 20 ml. of methanol was added to a solution of 7.3 g. (0.01 mole) of streptomycin sulfate in 50 ml. of water. Portionwise addition of 35 ml. of methanol gave a clear solution. After standing for 24 hours at 5°–10° C. the precipitated, solid 1,3-di(β-phenethyl)-2-streptomycyltetrahydroimidazole sulfate was collected by suction. It was hygroscopic and was dried in vacuo over $P_2O_5$. Weight—3.0 g. (30%) of glassy solid. M. P. 195°–205° C. (d.; browns at 160° C.); solubility in water—4400 u./ml.; potency—396 u./mg. (67.5% of theory).

*Analysis.*—Calculated for $C_{39}H_{61}N_9O_{11} \cdot 1\frac{1}{2}H_2SO_4$:

|  | Calculated | Found |
|---|---|---|
| C | 47.9 | 48.1 |
| H | 6.6 | 6.9 |

EXAMPLE IV

*1,3-di(dehydroabietyl)-2-streptomycyltetrahydroimidazole sulfate*

A solution of 3.0 g. (0.005 mole) of N,N'-di(dehydroabietyl)ethylene-diamine in 30 ml. of methanol and 10 ml. of acetone was added to a solution of 3.6 g. (0.005 mole) of streptomycin sulfate in 25 ml. of water. A fluocculent solid precipitated at once; this product became slightly gummy, but was collected by suction after three days at 5°–10° C. and dried in air to give 6.0 g. (92.5%) of yellow, solid 1,3-di(dehydroabietyl)-2-streptomycyltetrahydroimidazole sulfate. This was slurried in boiling water for a few minutes, cooled and collected by suction. Recovery—5.0 g.; potency—185 u./mg. (43% of theory); solubility in water—352 u./ml.

EXAMPLE V

*1,3-dicyclohexyl-2-streptomycyltetrahydroimidazole sulfate*

A solution of 2.4 grams (0.011 mole) of N,N'-dicyclohexyl-ethylene-diamine dissolved in the minimum amount of methanol is added to 7.3 g. (0.01 mole) streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-dicyclohexyl-2-streptomycyltetrahydroimidazole sulfate, precipitates either upon cooling or upon the addition of water and is collected by filtration or by decantation.

A 1.5 g. sample of this imidazole is heated for three hours at 100° C. in 25 ml. of 6 N HCl to regenerate the amine hydrochloride and soluble, active streptomycin.

EXAMPLE VI

*1,3-di-tert.-butyl-2-streptomycyltetrahydroimidazole sulfate*

A solution of 1.8 grams (about 0.01 mole) of N,N'-di-tert.-butylethylenediamine dissolved in the minimum amount of methanol is added to 7.3 g. (0.01 mole) streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-di-tert.-butyl-2-streptomycyltetrahydroimidazole sulfate, precipitates either upon cooling or upon the addition of water and is collected by filtration or by decantation.

A 1.5 g. sample of this imidazole is heated for three hours at 100° C. in 25 ml. of 6 N HCl to regenerate the amine hydrochloride and soluble, active streptomycin.

EXAMPLE VII

*1,3-di-(1,1,3,3-tetramethyl-n-butyl)-2-streptomycyltetrahydroimidazole sulfate*

A solution of 2.8 grams (0.01 mole) of N,N'-di-(1,1,3,3-tetramethyl-n-butyl)-ethylenediamine dissolved in the minimum amount of methanol is added to 7.3 g. (0.01 mole) streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-di-(1,1,3,3-tetramethyl-n-butyl)-2-streptomycyltetrahydroimidazole sulfate, precipitates either upon cooling or upon the addition of water and is collected by filtration or by decantation.

A 1.5 g. sample of this imidazole is heated for three hours at 100° C. in 25 ml. of 6 N HCl to regenerate the amine hydrochloride and soluble, active streptomycin.

EXAMPLE VIII

*1,3-di-n-heptyl-2-streptomycyltetrahydromidazole sulfate*

A solution of 2.7 grams (about 0.01 mole) of N,N'-di-n-heptylethylenediamine dissolved in the minimum amount of methanol is added to 7.3 g. (0.01 mole) streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-di-n-heptyl-2-streptomycyltetrahydroimidazole sulfate, precipitates either upon cooling or upon the addition of water and is collected by filtration or by decantation.

A 1.5 g. sample of this imidazole is heated for three hours at 100° C. in 25 ml. of 6 N HCl to regenerate the amine hydrochloride and soluble, active streptomycin.

EXAMPLE IX

*1,3-di-benzhydryl-2-streptomycyltetrahydroimidazole sulfate*

A solution of 4.3 grams (0.01 mole) of N,N'-di-benzhydrylethylenediamine dissolved in the minimum amount of methanol is added to 7.3 g. (0.01 mole) streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-di-benzhydryl-2-streptomycyltetrahydroimidazole sulfate, precipitates either upon cooling or upon the addition of water and is collected by filtration or by decantation.

A 1.5 g. sample of this imidazole is heated for three hours at 100° C. in 25 ml. of 6 N HCl to regenerate the amine hydrochloride and soluble, active streptomycin.

EXAMPLE X

*1,3-diphenyl-2-streptomycyltetrahydroimidazole sulfate*

A solution of 2.3 grams (0.01 mole) of N,N'-diphenylethylenediamine dissolved in the minimum amount of methanol is added to 7.3 g. (0.01 mole) streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-diphenyl-2-streptomycyltetrahydroimidazole sulfate, precipitates either upon cooling or upon the addition of water and is collected by filtration or by decantation.

A 1.5 g. sample of this imidazole is heated for three hours at 100° C. in 25 ml. of 6 N HCl to regenerate the amine hydrochloride and soluble, active streptomycin.

EXAMPLE XI

*N,N'-bis-dehydroabietylethylenediamine*

Dehydroabietylamine (190 grams), ethylene bromide (59.3 g.) and potassium carbonate (92 g.) were mixed with 2.5 liters toluene in a flask equipped with a stirrer and refluxed overnight. The toluene solution was filtered, washed with dilute sodium hydroxide and then two liters of water and the toluene removed by distillation to leave 175.3 g. crude product, N,N'-bis-dehydroabietylethylenediamine which was purified by distilling off the impurities, particularly dehydroabietylamine, up to 275° C./1 mm., at which point the product begins to distill.

EXAMPLE XII

N,N'-bis-(t-octyl)-ethylenediamine

A mixture of 650 grams (5.0 moles) of t-octylamine (Rohm and Haas, B. P. 137–142° C. at 760 mm., also called 1-amino-1,1,3,3-tetramethyl-n-butane) and 50 ml. of water was heated under reflux with stirring during the dropwise addition of 188 grams (1.0 mole) of ethylene dibromide, and heating was continued for an additional 8 hours. While still warm, the mixture was treated with 300 grams of 50% sodium hydroxide; the organic layer was separated and washed with dilute alkali and water. After drying, the material was fractionally distilled to yield about 260 grams (about 92% of theoretical) of N,N'-bis(i-octyl)-ethylenediamine boiling at 120° C. at a pressure of 0.5 mm. Hg.

EXAMPLE XIII

N,N'-bis-(cyclohexylmethyl)ethylenediamine

Commercially available 1,2,5,6-tetrahydrobenzaldehyde (30.0 grams; 0.272 mole) in 50 ml. methanol is mixed with 7.5 grams (0.125 mole) of anhydrous ethylenediamine. Appreciable heat is evolved and the solution turns yellow. Raney nickel catalyst (40.0 grams wet weight) washed successively with water and methanol is added and the mixture is hydrogenated with shaking in an atmosphere of hydrogen at about 50 pounds per square inch gauge at about 60° C. After the absorption of about two moles of hydrogen for each mole of tetrahydrobenzaldehyde used, the catalyst is removed by filtration and the solution is acidified with concentrated hydrochloric acid. White crystalline N,N'-bis(cyclohexylmethyl)ethylenediamine dihydrochloride precipitates and is collected. Upon recrystallization from water, this product melts at about 318°–319° C. with decomposition.

*Analysis.*—Calculated for $C_{16}H_{32}N_2 \cdot 2HCl$:

|   | Calculated | Found |
|---|---|---|
| C | 59.1 | 59.3 |
| H | 10.5 | 10.2 |

N,N'-bis-(cyclohexylmethyl)ethylenediamine dihydrochloride (3.2 grams, 0.01 mole) prepared as above, is suspended in water and neutralized with 50% sodium hydroxide. The liberated free base, N,N'-bis-(cyclohexylmethyl)ethylenediamine, is extracted into ether. The combined ethereal extracts are washed with water and saturated sodium chloride solution and filtered through anhydrous sodium sulfate. The solvent ether is removed by distillation, leaving the free base as a colorless oil.

EXAMPLE XIV

N,N'-bis-(3,5-dimethyl-2-hydroxybenzyl)-ethylenediamine

Anhydrous ethylenediamine (30.0 g., 0.5 mole) is added to a solution of 4-hydroxy-1,3-dimethylbenzene (122.2 g., 1.0 mole) in 250 ml. methanol. Formalin U. S. P. (75 ml., 1.0 mole) is added dropwise while the mixture is stirred and refluxed for nineteen hours. After adding 200 ml. of concentrated hydrochloric acid, followed by cooling and the addition of toluene to facilitate handling, the white, crystalline dihydrochloride of N,N'-bis-(3,5-dimethyl-2-hydroxybenzyl)-ethylenediamine precipitates and is collected by filtration.

After two recrystallizations from a mixture prepared from equal volumes of water and methanol to which about one-twentieth part of concentrated hydrochloric acid has been added, the product melts at about 225.5°–228.5° C.

*Analysis.*—Calculated for $C_{20}H_{30}Cl_2N_2O_2$:

|   | Calculated | Found |
|---|---|---|
| C | 59.84 | 60.0 |
| H | 7.53 | 7.61 |

The free base is liberated from the dihydrochloride with alkali in the usual manner.

EXAMPLE XV

N,N'-bis(alpha-methylbenzyl)-ethylenediamine

Alpha-methylbenzylamine (48.4 grams, 0.4 mole) is placed in a three-necked flask fitted with stirrer, condenser and dropping funnel and arranged for heating with an electric mantle. Ethylene dibromide (18.8 grams, 0.1 mole) is dropped into the heated amine over a period of two hours. After all of the bromide is added, 8 ml. of water is added and the reaction mixture is refluxed for an additional six hours. The mixture is allowed to cool to room temperature and is then neutralized by the addition of ten grams of sodium hydroxide in 25 ml. of water. The organic layer is separated, dried and distilled under reduced pressure to give N,N'-bis(alpha-methylbenzyl)ethylenediamine, boiling about 176°–185° C. at 4 mm. of mercury pressure.

EXAMPLE XVI

1,3-dipiperonyl-2-streptomycyl-tetrahydroimidazole sulfate

A solution of 3.3 grams of N,N'-dipiperonylethylenediamine (M. P. about 145° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Lyophilization of the reaction mixture leaves solid 1,3-di-(piperonyl)-2-streptomycyl-tetrahydroimidazole sulfate.

A 1.5 sample of this imidazole is heated for three hours at 100° C. in 25 ml. of 6 N HCl to regenerate the amine hydrochloride and soluble active streptomycin.

EXAMPLE XVII

1,3 - di(furfuryl) - 2 - streptomycyl - tetrahydroimidazole sulfate

A solution of 2.2 grams of N,N'-difurfurylethylenediamine (M. P. about 135°/0.15 mm.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The alcohol is removed by distillation in vacuo below 50° C. and replaced by water; upon cooling the product, 1,3-di(furfuryl)-2-streptomycyl - tetrahydroimidazole sulfate, precipitates as a gum which gradually solidifies upon seeding.

A 1.5 g. sample of this imidazole is heated for three hours at 100° C. in 25 ml. of 6 N HCl to regenerate the amine hydrochloride and soluble, active streptomycin.

EXAMPLE XVIII

1,3-bis-(2-heptyl)-2-streptomycyl-tetrahydroimidazole sulfate

A solution of 2.6 grams of N,N'-bis-(2-heptyl)-ethylenediamine (B. P. about 126° C./2 mm.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Upon cooling and the careful addition of water, the solid 1,3-bis-(2-heptyl)-2-streptomycyl-tetrahydroimidazole sulfate separates and is collected by filtration.

A 1.5 g. sample of this imidazole is heated for three hours at 100° C. in 25 ml. of 6 N HCl to regenerate the amine hydrochloride and soluble, active streptomycin.

EXAMPLE XIX

*1,3 - bis(gamma - phenylpropyl) - 2 - streptomycyl - tetrahydroimidazole sulfate*

A solution of 3.0 grams of N,N'-bis(gamma-phenylpropyl)-ethylene-diamine (B. P. about 160° C./0.25 mm.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. After cooling, the crystalline product, 1,3-bis(gamma-phenylpropyl)-2-streptomycyl-tetrahydroimidazole sulfate, is filtered off and dried.

A 1.5 g. sample of this imidazole is heated for three hours at 100° C. in 25 ml. of 6 N HCl to regenerate the amine hydrochloride and soluble, active streptomycin.

EXAMPLE XX

*1,3-di(cyclohexyl)-2-streptomycyl-tetrahydroimidazole sulfate*

A solution of 2.2 grams of N,N'-dicyclohexylethylenediamine (M. P. of hydrate about 82° C.; dihydrochloride melts about 315° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-di-(cyclohexyl-2-streptomycyl-tetrahydroimidazole sulfate, is recovered as a nearly white solid by removing the solvents by distillation in vacuo.

A 1.5 g. sample of this imidazole is heated for three hours at 100° C. in 25 ml. of 6 N HCl to regenerate the amine hydrochloride and soluble, active streptomycin.

EXAMPLE XXI

*1,3-bis-(4-methyl-2-pentyl)-2-streptomycyl-tetrahydroimidazole sulfate*

A solution of 2.3 grams of N,N'-bis-(4-methyl-2-pentyl)-ethylene-diamine (B. P. about 96° C./1 mm.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The solid product, 1,3-bis-(4-methyl-2-pentyl)-2-streptomycyl - tetrahydroimidazole sulfate, precipitates upon seeding and the addition of water and is collected by filtration and dried.

A 1.5 g. sample of this imidazole is heated for three hours at 100° C. in 25 ml. of 6 N HCl to regenerate the amine hydrochloride and soluble, active streptomycin.

EXAMPLE XXII

*1,3-bis-(3,5,5-trimethylhexyl)-2-streptomycyl-tetrahydroimidazole sulfate*

A solution of 3.1 grams of N,N'-bis-(3,5,5-trimethylhexyl)-ethylenediamine (B. P. about 150°/1.2 mm.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-bis-(3,5,5-trimethylhexyl) - 2-streptomycyl-tetrahydroimidazole sulfate, is recovered as a solid by lyophilization.

A 1.5 g. sample of this imidazole is heated for three hours at 100° C. in 25 ml. of 6 N HCl to regenerate the amine hydrochloride and soluble, active streptomycin.

EXAMPLE XXIII

*1,3-bis-(p-chlorobenzyl)-2-streptomycyl-tetrahydroimidazole sulfate*

A solution of 3.1 grams of N,N'-bis-(p-chlorobenzyl)-ethylenediamine (diacetate melts about 126° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The precipitate of 1,3-bis-(p-chlorobenzyl) - 2 - streptomycyl-tetrahydroimidazole sulfate which separates upon the addition of water is collected by filtration and dried.

A 1.5 g. sample of this imidazole is heated for three hours at 100° C. in 25 ml. of 6 N HCl to regenerate the amine hydrochloride and soluble, active streptomycin.

EXAMPLE XXIV

*1,3-bis-(2,4-dichlorobenzyl)-2-streptomycyl-tetrahydroimidazole sulfate*

A solution of 3.8 grams of N,N'-bis-(2,4-dichlorobenzyl)-ethylenediamine (picrate melts about 183° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-bis-(2,4-dichlorobenzyl) - 2-streptomycyl-tetrahydroimidazole sulfate, precipitates upon cooling as a somewhat yellow oil which on standing becomes crystalline. The crystals are removed by filtration and dried in vacuo.

A 1.5 g. sample of this imidazole is heated for three hours at 100° C. in 25 ml. of 6 N HCl to regenerate the amine hydrochloride and soluble, active, streptomycin.

EXAMPLE XXV

*1,3-bis-(p-nitrobenzyl)-2-streptomycyl-tetrahydroimidazole sulfate*

A solution of 3.3 grams of N,N'-bis-(p-nitrobenzyl)-ethylenediamine (dihydrochloride melts about 290° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The alcohol is removed by distillation in vacuo below 50° C. and replaced by water; upon cooling the product, 1,3-bis-(p-nitrobenzyl)-2-streptomycyl-tetrahydroimidazole sulfate, precipitates as a gum which gradually solidifies upon seeding.

A 1.5 g. sample of this imidazole is heated for three hours at 100° C. in 25 ml. of 6 N HCl to regenerate the amine hydrochloride and soluble, active streptomycin.

EXAMPLE XXVI

*1,3-bis-(p-aminobenzyl)-2-streptomycyl-tetrahydroimidazole sulfate*

A solution of 2.7 g. N,N'-bis-(p-aminobenzyl)-ethylenediamine (dihydrochloride melts above 300° C.) dissolved in the minimum amount of methanol is added to 7.3 g. streptomycin dissolved in 50 ml. water. The minimum amount of ethanol is added to ensure complete solution. After heating at 45°–50° C. for ten minutes, the reaction mixture is allowed to stand at room temperature for three days. The product, 1,3-bis-(p-aminobenzyl)-2-streptomycyl-tetrahydroimidazole sulfate, precipitates upon the addition of water and is filtered off and dried.

A 1.5 g. sample of this imidazole is heated for three hours at 100° C. in 25 ml. of 6 N HCl to regenerate the amine hydrochloride and soluble, active streptomycin.

EXAMPLE XXVII

*1,3-bis-(p-methoxybenzyl)-2-streptomycyl-tetrahydroimidazole sulfate*

A solution of 3.0 grams of N,N'-bis-(p-methoxybenzyl)-ethylenediamine (dihydrochloride melts about 285° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Upon cooling and the careful addition of water, the solid 1,3-bis-(p - methoxybenzyl)-2-streptomycyl-tetrahydroimidazole sulfate separates and is collected by filtration.

A 1.5 g. sample of this imidazole is heated for three hours at 100° C. in 25 ml. of 6 N HCl to regenerate the amine hydrochloride and soluble, active streptomycin.

EXAMPLE XXVIII

*1,3-bis-(2-thenyl)-2-streptomycyl-tetrahydroimidazole sulfate*

A solution of 2.5 grams of N,N'-bis-(2-thenyl)-ethylenediamine (diacetate melts about 84° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. After cooling, the crystalline product, 1,3 - bis-(2-thenyl)-2-streptomycyl-tetrahydroimidazole sulfate, is filtered off and dried.

A 1.5 g. sample of this imidazole is heated for three hours at 100° C. in 25 ml. of 6 N HCl to regenerate the amine hydrochloride and soluble, active streptomycin.

EXAMPLE XXIX

*1,3-bis-(2-methyl-cyclohexylmethyl)-2-streptomycyl-tetrahydroimidazole sulfate*

A solution of 2.8 grams of N,N'-bis-(2-methyl-cyclohexymethyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Lyophilization of the reaction mixture leaves solid 1,3 - bis - (2-methyl-cyclohexylmethyl)-2-streptomycyl-tetrahydroimidazole sulfate.

A 1.5 gram sample of this imidazole is heated for three hours at 100° C. in 25 ml. of 6 N HCl to regenerate the amine hydrochloride and soluble, active streptomycin.

EXAMPLE XXX

*1,3-bis-(3 - methyl - cyclohexylmethyl)-2-streptomycyl-tetrahydroimidazole sulfate*

A solution of 2.8 grams of N,N'-bis-(3-methyl-cyclohexylmethyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The alcohol is removed by distillation in vacuo below 50° C. and replaced by water; upon cooling the product, 1,3 - bis-(3-methyl-cyclohexylmethyl)-2-streptomycyl-tetrahydroimidazole sulfate, precipitates as a gum which gradually solidifies upon seeding.

A 1.5 gram sample of this imidazole is heated for three hours at 100° C. in 25 ml. of 6 N HCl to regenerate the amine hydrochloride and soluble streptomycin.

EXAMPLE XXXI

*1,3-bis - (4 - methyl-cyclohexylmethyl)-2-streptomycyl-tetrahydroimidazole sulfate*

A solution of 2.8 grams of N,N'-bis-(4-methyl-cyclohexylmethyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The precipitate of 1,3-bis-(4-methyl-cyclohexylmethyl)-2-streptomycyl-tetrahydroimidazole sulfate which separates upon the addition of water is collected by filtration and dried.

A 1.5 gram sample of this imidazole is heated for three hours at 100° C. in 25 ml. of 6 N HCl to regenerate the amine hydrochloride and soluble, active streptomycin.

EXAMPLE XXXII

*1,3-bis-(4 - methoxy-cyclohexylmethyl) - 2-streptomycyl-tetrahydroimidazole sulfate*

A solution of 3.1 grams of N,N'-bis-(4-methoxy-cyclohexylmethyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-bis-(4-methoxy-cyclohexylmethyl)-2-streptomycyl-tetrahydroimidazole sulfate, is recovered as a nearly white solid by removing the solvents by distillation in vacuo.

A 1.5 gram sample of this imidazole is heated for three hours at 100° C. in 25 ml. of 6 N HCl to regenerate the amine hydrochloride and soluble, active streptomycin.

EXAMPLE XXXIII

*1,3-bis-(3 - methoxy-cyclohexylmethyl) - 2-streptomycyl-tetrahydroimidazole sulfate*

A solution of 2.2 grams of N,N'-bis-(3-methoxy-cyclohexylmethyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-bis-(3-methoxy-cyclohexylmethyl)-2-streptomycyl-tetrahydroimidazole sulfate, is recovered as a solid by lyophilization.

A 1.5 gram sample of this imidazole is heated for three hours at 100° C. in 25 ml. of 6 N HCl to regenerate the amine hydrochloride and soluble, active streptomycin.

EXAMPLE XXXIV

*1,3-bis - 2(2 - methylthenyl)-2-streptomycyl-tetrahydroimidazole sulfate*

A solution of 2.8 grams of N,N'-bis-2(2-methylthenyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-bis-2(2-methylthenyl)-2-streptomycyl-tetrahydroimidazole sulfate, precipitates upon cooling as a somewhat yellow oil which on standing becomes crystalline. The crystals are removed by filtration and dried in vacuo.

A 1.5 gram sample of this imidazole is heated for three hours at 100° C. in 25 ml. of 6 N HCl to regenerate the amine hydrochloride and soluble, active streptomycin.

EXAMPLE XXXV

*1,3-bis-2(quinolylethyl)-2-streptomycyl-tetrahydroimidazole sulfate*

A solution of 3.7 grams of N,N'-bis-2(quinolylethyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3 - bis-2(quinolylethyl)-2-streptomycyl-tetrahydroimidazole sulfate, precipitates upon the addition of water and is filtered off and dried.

A 1.5 gram sample of this imidazole is heated for three hours at 100° C. in 25 ml. of 6 N HCl to regenerate the amine hydrochloride and soluble, active streptomycin.

EXAMPLE XXXVI

*1 - benzyl - 3 - alpha - ethylbenzyl - 2 - streptomycyl - tetrahydroimidazole sulfate*

A solution of 2.7 grams of N-benzyl-N'-alpha-ethylbenzyl-ethylenediamine (dihydrochloride melts about 306° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The solid product, 1 - benzyl - 3 - alpha - ethylbenzyl - 2 - streptomycyl-tetrahydroimidazole sulfate, precipitates upon seeding and the addition of water and is collected by filtration and dried.

A 1.5 gram sample of this imidazole is heated for three hours at 100° C. in 25 ml. of 6 N HCl to regenerate the amine hydrochloride and soluble, active streptomycin.

EXAMPLE XXXVII

*1,3 - bis - (p - methylbenzyl) - 2 - streptomycyl - tetrahydroimidazole sulfate*

A solution of 2.7 grams of N,N'-bis(p-methylbenzyl)-ethylenediamine (diacetate melts about 116° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Upon cooling and the careful addition of water, the solid 1,3-bis-(p-methylbenzyl)-2-streptomycyl-tetrahydroimidazole sulfate separates and is collected by filtration.

A 1.5 gram sample of this imidazole is heated for three hours at 100° C. in 25 ml. of 6 N HCl to regenerate the amine hydrochloride and soluble, active streptomycin.

EXAMPLE XXXVIII

*1,3 - bis(m - methylbenzyl) - 2 - streptomycyl - tetrahydroimidazole sulfate*

A solution of 2.7 grams of N,N'-bis(m-methylbenzyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. After cooling, the crystalline product, 1,3-bis(m-methylbenzyl)-2-streptomycyl-tetrahydroimidazole sulfate, is filtered off and dried.

A 1.5 gram sample of this imidazole is heated for three hours at 100° C. in 25 ml. of 6 N HCl to regenerate the amine hydrochloride and soluble, active streptomycin.

EXAMPLE XXXIX

*1,3 - bis(o - methylbenzyl) - 2 - streptomycyl - tetrahydroimidazole sulfate*

A solution of 2.7 grams of N,N'-bis(o-methylbenzyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Lyophilization of the reaction mixture leaves solid 1,3 - bis - (o - methylbenzyl) - 2 - streptomycyl - tetrahydroimidazole sulfate.

A 1.5 gram sample of this imidazole is heated for three hours at 100° C. in 25 ml. of 6 N HCl to regenerate the amine hydrochloride and soluble, active streptomycin.

EXAMPLE XL

*1,3 - bis - (beta - phenylethyl) - 2 - streptomycyl - tetrahydroimidazole sulfate*

A solution of 3.0 grams of N,N'-bis-(beta-phenylethyl)-ethylenediamine (diacetate melts about 114° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The alcohol is removed by distillation in vacuo below 50° C. and replaced by water; upon cooling the product, 1,3-bis-(beta-phenylethyl)-2-streptomycyl-tetrahydroimidazole sulfate, precipitates as a gum which gradually solidifies upon seeding.

A 1.5 gram sample of this imidazole is heated for three hours at 100° C. in 25 ml. of 6 N HCl to regenerate the amine hydrochloride and soluble, active streptomycin.

EXAMPLE XLI

*1,3 - bis - (lauryl) - 2 - streptomycyl - tetrahydroimidazole sulfate*

A solution of 4.0 grams of N,N'-bis-(lauryl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The precipitate of 1,3-bis-(lauryl) - 2 - streptomycyl - tetrahydroimidazole sulfate which separates upon the addition of water is collected by filtration and dried.

A 1.5 gram sample of this imidazole is heated for three hours at 100° C. in 25 ml. of 6 N HCl to regenerate the amine hydrochloride and soluble, active streptomycin.

EXAMPLE XLII

*1,3 - bis - (3 - methylcyclohexyl) - 2 - streptomycyl - tetrahydroimidazole sulfate*

A solution of 2.5 grams of N,N'bis-(3-methylcyclohexyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-bis-(3-methylcyclohexyl) - 2 - streptomycyl-tetrahydroimidazole sulfate, is recovered as a nearly white solid by removing the solvents by distillation in vacuo.

A 1.5 gram sample of this imidazole is heated for three hours at 100° C. in 25 ml. of 6 N HCl to regenerate the amine hydrochloride and soluble, active streptomycin.

EXAMPLE XLIII

*1,3 - bis - (2 - methylcyclohexyl) - 2 - streptomycyl - tetrahydroimidazole sulfate*

A solution of 2.5 grams of N,N'-bis-(2-methylcyclohexyl) - ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3 - bis - (2 - methylcyclohexyl) - 2 - streptomycyl-tetrahydroimidazole sulfate, is recovered as a solid by lyophilization.

A 1.5 gram sample of this imidazole is heated for three hours at 100° C. in 25 ml. of 6 N HCl to regenerate the amine hydrochloride and soluble, active streptomycin.

EXAMPLE XLIV

*1,3-bis-(4-methylcyclohexy)-2-streptomycyl-tetrahydroimidazole sulfate*

A solution of 2.5 grams of N,N'-bis-(4-methylcyclohexyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3 - bis - (4 - methylcyclohexyl)-2-streptomycyl-tetrahydroimidazole sulfate, precipitates upon cooling as a somewhat yellow oil which on standing become crystalline. The crystals are removed by filtration and dried in vacuo.

EXAMPLE XLV

*1,3-bis-(3-nitrophenyl)-2-streptomycyl-tetrahydroimidazole sulfate*

A solution of 3.3 grams of N,N'-bis-(3-nitrophenyl)-ethylenediamine dissolved in the minimum amount of methanol is added to 7.3 g. streptomycin sulfate dissolved in 50. ml. water. The minimum amount of ethanol is added to ensure complete solution. After heating at 45°–50° C. for ten minutes, the reaction mixture is allowed to stand at room temperature for three days. The product, 1,3 - bis - (3-nitrophenyl)-2-streptomycyl-tetrahydroimidazole sulfate, precipitates upon the addition of water and is filtered off and dried.

A 1.5 gram sample of this imidazole is heated for three hours at 100° C. in 25 ml. of 6 N HCl to regenerate the amine hydrochloride and soluble, active streptomycin.

EXAMPLE XLVI

*1,3-bis-2-(6-methylpyridyl)-2-streptomycyl-tetrahydroimidazole sulfate*

A solutions of 2.4 grams of N,N'-bis-2-(6-methylpyridyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The solid product, 1,3-bis-2-(6-methylpyridyl)-2-streptomycyl-tetrahydroimidazole sulfate, precipitates upon seeding and the addition of water and is collected by filtration and dried.

A 1.5 gram sample of this imidazole is heated for three hours at 100° C. in 25 ml. of 6 N HCl to regenerate the amine hydrochloride and soluble, active streptomycin.

EXAMPLE XLVII

*1,3 - bis-2-(5-methylpyridyl)-2-streptomycyl-tetrahydroimidazole sulfate*

A solution of 2.4 grams of N,N'-bis-2-(5-methylpyridyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Upon cooling and the careful addition of water, the solid 1,3-bis-2-(5-methylpyridyl)-2-streptomycyl - tetrahydroimidazole sulfate separates and is collected by filtration.

A 1.5 gram sample of this imidazole is heated for three hours at 100° C. in 25 ml. of 6 N HCl to regenerate the amine hydrochloride and soluble, active streptomycin.

EXAMPLE XLVIII

*1,3-bis-2(4-methylpyridyl)-2-streptomycyl-tetrahydroimidazole sulfate*

A solution of 2.4 grams of N,N'-bis-2-(4-methylpyridyl)- ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. After cooling, the crystalline product, 1,3-bis-2-(4-methylpyridyl)-2-streptomycyl-tetrahydroimidazole sulfate, is filtered off and dried.

A 1.5 gram sample of this imidazole is heated for three hours at 100° C. in 25 ml. of 6 N HCl to regenerate the amine hydrochloride and soluble, active streptomycin.

EXAMPLE XLIX

*1,3 - bis-2-(3 - methylpyridyl)-2-streptomycyl - tetrahydroimidazole sulfate*

A solution of 2.4 grams of N,N'-bis-2-(3-methylpyridyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Lyophilization of the reaction mixture leaves solid 1,3-bis-2-(3-methylpyridyl) - 2 - streptomycyl-tetrahydroimidazole sulfate.

A 1.5 gram sample of this imidazole is heated for three hours at 100° C. in 25 ml. of 6 N HCl to regenerate the amine hydrochloride and soluble, active streptomycin.

EXAMPLE L

*1,3-bis-2-thiazolyl-2-streptomycyl-tetrahydroimidazole sulfate*

A solution of 2.3 grams of N,N'-bis-2-thiazolyl-ethylenediamine dissolved in the minimum amount of methanol is added to 7.3 grams streptomycin sulfate dissolved in 50 ml. water. The minimum amount of ethanol is added to ensure complete solution. After heating at 45°–50° C. for ten minutes, the reaction mixture is allowed to stand at room temperature for three days. The alcohol is removed by distillation in vacuo below 50° C. and replaced by water; upon cooling the product, 1-3-bis-2-thiazolyl-2-streptomycyl-tetrahydroimidazole sulfate, precipitates as a gum which gradually solidifies upon seeding.

A 1.5 gram sample of this imidazole is heated for three hours at 100° C. in 25 ml. of 6 N HCl to regenerate the amine hydrochloride and soluble, active streptomycin.

EXAMPLE LI

*1,3-bis-2(5-methylfuryl)-2-streptomycyl-tetrahydroimidazole sulfate*

A solution of 2.2 grams of N,N'-bis-2(5-methylfuryl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The precipitate of 1,3-bis-2(5-methylfuryl)-2-streptomycyl-tetrahydroimidazole sulfate which separates upon the addition of water is collected by filtration and dried.

A 1.5 gram sample of this imidazole is heated for three hours at 100° C. in 25 ml. of 6 N HCl to regenerate the amine hydrochloride and soluble, active streptomycin.

EXAMPLE LII

*1,3-bis-(p-hydroxybenzyl)-2-streptomycyl-tetrahydroimidazole sulfate*

A solution of 2.7 grams of N,N'-bis-(p-hydroxybenzyl)-ethylenediamine (dihydrochloride melts at about 242° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-bis-(p-hydroxybenzyl)-2-streptomycyl-tetrahydroimidazole sulfate, is recovered as a nearly white solid by removing the solvents by distillation in vacuo.

A 1.5 gram sample of this imidazole is heated for three hours at 100° C. in 25 ml. of 6 N HCl to regenerate the amine hydrochloride and soluble, active streptomycin.

EXAMPLE LIII

*1,3 - bis - (cyclopentyl) - 2 - streptomycyl - tetrahydroimidazole sulfate*

A solution of 2.0 grams of N,N'-bis-(cyclopentyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3 - bis - (cyclopentyl) - 2-streptomycyl-tetrahydroimidazole sulfate, is recovered as a solid by lyophilization.

A 1.5 gram sample of this imidazole is heated for three hours at 100° C. in 25 ml. of 6 N HCl to regenerate the amine hydrochloride and soluble, active streptomycin.

EXAMPLE LIV

*1,3 - bis - (undecyl) - 2 - streptomycl - tetrahydro - imidazole sulfate*

A solution of 3.7 grams of N,N'-bis(undecyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-bis-(undecyl)-2-streptomycl-tetrahydroimidazole sulfate, precipitates upon cooling as a somewhat yellow oil which on standing becomes crystalline. The crystals are removed by filtration and dried in vacuo.

A 1.5 gram sample of this imidazole is heated for three hours at 100° C. in 25 ml. of 6 N HCl to regenerate the amine hydrochloride and soluble, active streptomycin.

EXAMPLE LV

*1,3 - bis - (4 - methoxycyclohexyl) - 2 - streptomycl - tetrahydroimidazole sulfate*

A solution of 2.8 grams of N,N'-bis-(4-methoxycyclohexyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-bis-(4-methoxycyclohexyl)-2-streptomycyl-tetrahydroimidazole sulfate, precipitates upon the addition of water and is filtered off and dried.

A 1.5 gram sample of this imidazole is heated for three hours at 100° C. in 25 ml. of 6 N HCl to regenerate the amine hydrochloride and soluble, active streptomycin.

EXAMPLE LVI

*1,3 - bis - (vanillyl) - 2 - streptomycl - tetrahydroimidazole sulfate*

A solution of 3.3 grams of N,N'-bis-(vanillyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The solid product, 1,3 - bis - (vanillyl) - 2 - streptomycyl - tetrahydroimidazole sulfate, precipitates upon seeding and the addition of water and is collected by filtration and dried.

A 1.5 gram sample of this imidazole is heated for three hours at 100° C. in 25 ml. of 6N HCl to regenerate the amine hydrochloride and soluble, active streptomycin.

EXAMPLE LVII

*1 - cyclohexyl - 3 - ethyl - 2 - streptomycyl - tetrahydroimidazole sulfate*

A solution of 1.7 grams of N-cyclohexyl-N'-ethyl-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Upon cooling and the careful addition of water, the solid 1-cyclohexyl-3-ethyl - 2 - streptomycyl - tetrahydroimidazole sulfate separates and is collected by filtration.

A 1.5 gram sample of this imidazole is heated for three hours at 100° C. in 25 ml. of 6 N HCl to regenerate the amine hydrochloride and soluble, active streptomycin.

EXAMPLE LVIII

*1 - benzyl - 3 - vanillyl - 2 - streptomycyl - tetrahydroimidazole sulfate*

A solution of 2.9 grams of N-benzyl-N'-vanillyl-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. After cooling, the crystalline product, 1 - benzyl - 3 - vanillyl - 2 - streptomycyl-tetrahydroimidazole sulfate, is filtered off and dried.

A 1.5 g. sample of this imidazole is heated for three hours at 100° C. in 25 ml. of 6 N HCl to regenerate the amine hydrochloride and soluble, active streptomycin.

EXAMPLE LIX

*1,3 - di- n - butyl - 2 - streptomycyl - tetrahydroimidazole sulfate*

A solution of 1.7 grams of N,N'-di-n-butyl-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Lyophilization of the reaction mixture leaves soild 1,3-di-n-butyl-2-streptomycyl-tetrahydroimidazole sulfate.

A 1.5 gram sample of this imidazole is heated for three hours at 100° C. in 25 ml. of 6 N HCl to regenerate the amine hydrochloride and soluble, active streptomycin.

EXAMPLE LX

*1,3 - di - iso - butyl - 2 - streptomycyl - tetrahydroimidazole sulfate*

A solution of 1.7 grams of N,N'-di-iso-butyl-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The alcohol is removed by distillation in vacuo below 50° C. and replaced by water; upon cooling the product, 1,3-di-iso-butyl-2-streptomycyl-tetrahydroimidazole sulfate, precipitates as a gum which gradually solidifies upon seeding.

A 1.5 gram sample of this imidazole is heated for three hours at 100° C. in 25 ml. of 6 N HCl to regenerate the amine hydrochloride and soluble, active streptomycin.

EXAMPLE LXI

*1,3 - di - sec. - butyl-2-streptomycyl-tetrahydroimidazole sulfate*

A solution of 1.7 grams of N,N'-di-sec.-butyl-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The precipitate of 1,3 - di - sec.-butyl - 2 - streptomycyl-tetrahydroimidazole sulfate which separates upon the addition of water is collected by filtration and dried.

A 1.5 gram sample of this imidazole is heated for three hours at 100° C. in 25 ml. of 6 N HCl to regenerate the amine hydrochloride and soluble, active streptomycin.

EXAMPLE LXII

*1,3-bis-(1-naphthyl)-2-streptomycyl - tetrahydroimidazole sulfate*

A solution of 3.1 grams of N,N'-bis-(1-naphthyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The precipitate of 1,3-bis-(1-naphthyl)-2-streptomycyl-tetrahydroimidazole sulfate is recovered as a nearly white solid by removing the solvents by distillation in vacuo.

A 1.5 gram sample of this imidazole is heated for three hours at 100° C. in 25 ml. of 6 N HCl to regenerate the amine hydrochloride and soluble, active streptomycin.

EXAMPLE LXIII

*1,3-bis-(2-naphthyl)-2-streptomycyl - tetrahydroimidazole sulfate*

A solution of 3.1 grams of N,N'-bis-(2-naphthyl)-ethylenediamine dissolved in the minimum amount of methanol is added to 7.3 g. streptomycin sulfate dissolved in 50 ml. water. The minimum of ethanol is added.

EXAMPLE LXIV

*1,3-bis-(2-pyridyl) - 2 - streptomycyl-tetrahydroimidazole sulfate*

A solution of 2.1 grams of N,N'-bis-(2-pyridyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-bis-(2-pyridyl) - 2 - streptomycyl-tetrahydroimidazole sulfate, is recovered as a solid by lyophilization.

A 1.5 g. sample of this imidazole is heated for three hours at 100° C. in 25 ml. of 6 N HCl to regenerate the amine hydrochloride and soluble, active streptomycin.

EXAMPLE LXV

*1,3-bis-(benzhydryl)-2-streptomycyl - tetrahydroimidazole sulfate*

A solution of 3.9 grams of N,N'-bis-(benzhydryl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1,3-bis-(benzhydryl)-2-streptomycyl-tetrahydroimidazole sulfate, precipitates upon cooling as a somewhat yellow oil which on standing becomes crystalline. The crystals are removed by filtration and dried in vacuo.

A 1.5 gram sample of this imidazole is heated for three hours at 100° C. in 25 ml. of 6 N HCl to regenerate the amine hydrochloride and soluble, active streptomycin.

EXAMPLE LXVI

*1,3-bis-(3,4-dimethoxybenzyl)-2-streptomycyl-tetrahydroimidazole sulfate*

A solution of 3.6 grams of N,N'-bis(3,4-dimethoxybenzyl)-ethylenediamine dissolved in the minimum amount of methanol is added to 7.3 g.

EXAMPLE LXVII

*1 - benzyl-3-p-methoxybenzyl-2-streptomycyl - tetrahydroimidazole sulfate*

A solution of 2.7 grams of N-benzyl-N'-p-methoxybenzylethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 1-benzyl-3-p-methoxybenzyl-2-streptomycyl - tetrahydroimidazole sulfate, precipitates upon the addition of water and is filtered off and dried.

A 1.5 g. sample of this imidazole is heated for three hours at 100° C. in 25 ml. of 6 N HCl to regenerate the amine hydrochloride and soluble, active streptomycin.

EXAMPLE LXVIII

*1,3-bis-(amyl)-2-streptomycyl-tetrahydroimidazole sulfate*

A solution of 2.0 grams of N,N'-bis(amyl)-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The solid product, 1,3 - bis - (amyl)-2-streptomycyl-tetrahydroimidazole sulfate, precipitates upon seeding and the addition of water and is collected by filtration and dried.

A 1.5 gram sample of this imidazole is heated for three hours at 100° C. in 25 ml. of 6 N HCl to regenerate the amine hydrochloride and soluble, active streptomycin.

EXAMPLE LXIX

*1-ethyl - 3 - phenethyl-2-streptomycyl-tetrahydroimidazole sulfate*

A solution of 1.9 grams of N-ethyl-N'-phenethyl-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Upon cooling and the careful addition of water, the solid 1-ethyl-3-phenethyl-2-streptomycyl-tetrahydroimidazole sulfate separates and is collected by filtration.

A 1.5 gram sample of this imidazole is heated for three hours at 100° C. in 25 ml. of 6 N HCl to regenerate the amine hydrochloride and soluble, active streptomycin.

EXAMPLE LXX

*1,3 - bis - (orthochlorobenzyl)-2-streptomycyl-tetrahydroimidazole sulfate*

A solution of 3.1 grams of N,N'-bis-(orthochlorobenzyl)-ethylenediamine (dipenicillin G salt melts about 133° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. After cooling, the crystalline product, 1,3-bis-(orthochlorobenzyl)-2-streptomycyl-tetrahydroimidazole sulfate, is filtered off and dried.

A 1.5 gram sample of this imidazole is heated for three hours at 100° C. in 25 ml. of 6 N HCl to regenerate the amine hydrochloride and soluble, active streptomycin.

EXAMPLE LXXI

*1,3 - bis - (orthohydroxybenzyl) - 2 - streptomycyl - tetrahydroimidazole sulfate*

A solution of 2.7 grams of N,N'-bis-(orthohydroxybenzyl)-ethylenediamine (dipenicillin G salt melts about 115° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Lyophilization of the reaction mixture leaves solid 1,3-bis-(orthohydroxybenzyl)-2-streptomycyl-tetrahydroimidazole sulfate.

A 1.5 gram sample of this imidazole is heated for three hours at 100° C. in 25 ml. of 6 N HCl to regenerate the amine hydrochloride and soluble, active streptomycin.

EXAMPLE LXXII

*1 - benzyl - 3 - (2 - hydroxylbenzyl) - 2 - streptomycyltetrahydroimidazole sulfate*

A solution of 2.6 grams of N-benzyl-N'-(2-hydroxylbenzyl)-ethylenediamine (dipenicillin G salt melts about 126° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The alcohol is removed by distillation in vacuo below 50° C. and replaced by water; upon cooling the product, 1-benzyl-3-(2-hydroxylbenzyl) - 2 - streptomycyl - tetrahydroimidazole sulfate, precipitates as a gum which gradually solidifies upon seeding.

A 1.5 gram sample of this imidazole is heated for three hours at 100° C. in 25 ml. of 6 N HCl to regenerate the amine hydrochloride and soluble, active streptomycin.

EXAMPLE LXXIII

*1-benzyl-3-(3-ethoxy-4-hydroxybenzyl)-2-streptomycyltetrahydroimidazole sulfate*

A solution of 3.0 grams of N-benzyl-N'-(3-ethoxy-4-hydroxybenzyl)-ethylenediamine (dipenicillin G salt melts about 120° C.) dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The precipitate of 1-benzyl-3-(3-ethoxy-4-hydroxybenzyl)-2-streptomycyl-tetrahydroimidazole sulfate which separates upon the addition of water is collected by filtration and dried.

A 1.5 gram sample of this imidazole is heated for three hours at 100° C. in 25 ml. of 6 N HCl to regenerate the amine hydrochloride and soluble, active streptomycin.

EXAMPLE LXXIV

*4-methyl-1,3-di-n-heptyl-2-streptomycyl-tetrahydroimidazole sulfate*

A solution of 2.7 grams of 1-methyl-N,N'-di-n-heptyl-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 4-methyl-1,3-di-n-heptyl-2-streptomycyl-tetrahydroimidazole sulfate, is recovered as a nearly white solid by removing the solvents by distillation in vacuo.

A 1.5 gram sample of this imidazole is heated for three hours at 100° C. in 25 ml. of 6 N HCl to regenerate the amine hydrochloride and soluble, active streptomycin.

EXAMPLE LXXV

*4,5-dimethyl-1,3-dibenzyl-2-streptomycyl-tetrahydroimidazole sulfate*

A solution of 2.6 grams of 1,2-dimethyl-N,N'-dibenzyl-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 4,5-dimethyl-1,3-dibenzyl-2-streptomycyl-tetrahydroimidazole sulfate, is recovered as a solid by lyophilization.

A 1.5 gram sample of this imidazole is heated for three hours at 100° C. in 25 ml. of 6 N HCl to regenerate the amine hydrochloride and soluble, active streptomycin.

EXAMPLE LXXVI

*4-methyl-1,3-dibenzyl-2-streptomycyl-tetrahydroimidazole sulfate*

A solution of 2.5 grams of 1-methyl-N,N'-dibenzyl-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 4 - methyl - 1,3 - dibenzyl - 2 - streptomycyl - tetrahydroimidazole sulfate, precipitates upon cooling as a somewhat yellow oil which on standing becomes crystalline. The crystals are removed by filtration and dried in vacuo.

A 1.5 gram sample of this imidazole is heated for three hours at 100° C. in 25 ml. of 6 N HCl to regenerate the amine hydrochloride and soluble, active streptomycin.

EXAMPLE LXXVII

*4,5-dimethyl-1,3-di-n-heptyl-2-streptomycyl-tetrahydroimidazole sulfate*

A solution of 2.8 grams of 1,2-dimethyl-N-N'-di-n-heptyl-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The product, 4,5 - dimethyl - 1,3 - di - n - heptyl - 2 - streptomycyltetrahydroimidazole sulfate, precipitates upon the addition of water and is filtered off and dried.

A 1.5 gram sample of this imidazole is heated for three hours at 100° C. in 25 ml. of 6 N HCl to regenerate the amine hydrochloride and soluble, active streptomycin.

EXAMPLE LXXVIII

*4,5-dimethyl-1,3-di-cyclohexylmethyl-2-streptomycyltetrahydroimidazole sulfate*

A solution of 2.7 grams of 4,5-dimethyl-1,3-di-cyclohexylmethyl-2-streptomycyl-tetrahydroimidazole sulfate dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. The solid product, 4,5-dimethyl - 1,3 - dicyclohexylmethyl - 2 - streptomycyltetrahydroimidazole sulfate, precipitates upon seeding and the addition of water and is collected by filtration and dried.

A 1.5 gram sample of this imidazole is heated for three hours at 100° C. in 25 ml. of 6 N HCl to regenerate the amine hydrochloride and soluble, active streptomycin.

EXAMPLE LXXIX

*4 - methyl - 1,3 - di - cyclohexylmethyl - 2 - streptomycyl-tetrahydroimidazole sulfate*

A solution of 2.6 grams of 1-methyl-N,N'-di-cyclohexylmethyl-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Upon cooling and the careful addition of water, the solid 4 - methyl - 1,3 - di - cyclohexylmethyl - 2 - streptomycyl-tetrahydroimidazole sulfate separates and is collected by filtration.

A 1.5 gram sample of this imidazole is heated for three hours at 100° C. in 25 ml. of 6 N HCl to regenerate the amine hydrochloride and soluble, active streptomycin.

EXAMPLE LXXX

*4,5 - dimethyl - 1,3 - di-cyclohexyl - 2 - streptomycyl-tetrahydroimidazole sulfate*

A solution of 2.4 grams of 1,2-dimethyl-N,N'-di-cyclohexyl-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. After cooling, the crystalline product, 4,5-dimethyl-1,3-di-cyclohexyl-2-streptomycyl-tetrahydroimidazole sulfate, is filtered off and dried.

A 1.5 gram sample of this imidazole is heated for three hours at 100° C. in 25 ml. of 6 N HCl to regenerate the amine hydrochloride and soluble, active streptomycin.

EXAMPLE LXXXI

*4 - methyl - 1,3 - di - cyclohexyl - 2 - streptomycyl-tetrahydroimidazole sulfate*

A solution of 2.3 grams of 1-methyl-N,N'-di-cyclohexyl-ethylenediamine dissolved in the minimum amount of methanol is added to 7.3 g. streptomycin sulfate dissolved in 50 ml. water. The minimum amount of ethanol is added to ensure complete solution. After heating at 45°–50° C. for ten minutes, the reaction mixture is allowed to stand at room temperature for three days. Lyophilization of the reaction mixture leaves solid 4-methyl - 1,3 - di - cyclohexyl - 2 - streptomycyl - tetrahydroimidazole sulfate.

A 1.5 gram sample of this imidazole is heated for three hours at 100° C. in 25 ml. of 6 N HCl to regenerate the amine hydrochloride and soluble, active streptomycin.

EXAMPLE LXXXII

*1,3 - dibenzyl - 2 - streptomycyl - tetrahydroimidazole sulfate*

Eight grams of solid streptomycin sulfate (potency—475 units/mgm. by *B. subtilis* assay; partially purified by adsorption on and elution from ion-exchange resin columns) was dissolved in 50 ml. water and mixed with a solution of 10 mls. N,N'- dibenzyl-ethylenediamine in 70 mls. methanol to give a clear solution which was heated to 50° C. for one hour. 1,3-dibenzyl-2-streptomycyl-tetrahydroimidazole sulfate (7.64 grams) precipitated and was collected by filtration, dried over $P_2O_5$ and found to assay 600 units/mgm. The filtrate (78 mls.) assayed 2880 units/ml.

7.5 grams of this 1,3-dibenzyl-2-streptomycyl-tetrahydroimidazole sulfate were placed in water and the pH was adjusted to pH 2 with sulfuric acid. N,N'dibenzyl-ethylenediamine sulfate precipitated and was collected by filtration (1.04 g.). Addition of five volumes of methanol to the filtrate precipitated solid streptomycin sulfate (4.08 g.) assaying 625 u/mgm.

EXAMPLE LXXXIII

Fifty mls. of streptomycin liquor assaying 182,000 units/ml. (*B. subtilis* assay) and obtained by elution of broth adsorbed on an ion-exchange resin column was added to 10 mls. N,N'-dibenzylethylenediamine in 65 mls. methanol, liberating heat and giving a clear solution which was heated to 50° C. for one hour and then allowed to stand overnight. 1,3-dibenzyl-2-streptomycyl-tetrahydroimidazole sulfate precipitated and was collected by filtration, dried over $P_2O_5$ and found to weight 4.1 grams and to assay 528 units/mgm. The filtrate, 39 mls., assayed 2480 units/ml.

Four grams of this 1,3-dibenzyl-2-streptomycyl-tetrahydroimidazole sulfate was placed in water and the pH was adjusted to pH 2.0 with sulfuric acid. After standing, the volume was reduced by one-half by distillation in vacuo and the N,N'-dibenzyl-ethylenediamine sulfate which precipitated (0.92 g.) was removed by filtration. The addition of five volumes methanol precipitated 2.53 g. streptomycin sulfate assaying 560 units/mgm; the filtrate (925 ml.) assayed 122 units/ml.

1,3-dibenzyl-2-streptomycyl-tetrahydroimidazole sulfate (2%) in 4% aqueous acacia suspension has $LD_{50}$ (minimum lethal dose in 50% of animals) of about 342±21 mgm./kg. by intraperitoneal injection in mice.

Streptomycin sulfate, 1,3-dibenzyl-2-streptomycyl-tetrahydroimidazole sulfate and 1,3-di(beta-phenylethyl)-2-streptomycyl-tetrahydroimidazole sulfate by in vitro test all have minimum inhibitory concentrations of 0.0002 mgm./ml. against the streptomycin-sensitive strain H37RU of *Mycobacterium tuberculosis* and all fail to inhibit streptomycin-resistant strain H37RUR.

The $CD_{50}$ (Curative Dose–50) is the minimum intraperitoneal dose of the drug which will cure 50 percent of a group of mice injected intraperitoneally with 100 to 1000 $LD_{50}$ doses of *Diplococcus pneumoniae*, each $LD_{50}$ dose being sufficient if given alone to kill 50 percent of a group of mice. One-half the dose of test drug is given twenty-four hours before the simultaneous injection of the other half of the test drug and the challenge (infection). The animals are observed for four days and deaths for each group expressed as the percentage of the total animals per group. The percentage death is transformed to probit values and these plotted against the log of the dose in mgms. per kg. of mouse weight. The point of intersection of the probit 5 line and the best line constructed through the experimental points describes the concentration of drug which should protect half the animals under the conditions of the experiment. The antilog of this term is called the $CD_{50}$ value. Using aqueous suspensions, including sodium carboxymethylcellulose and having pH about 7, of the two new drugs, the following values for $CD_{50}$ were found as above: 6.8 mgm./kg. for streptomycin sulfate; 45 mgm./kg. for 1,3-dibenzyl-2-streptomycyltetrahydroimidazole sulfate; and 60 mgm./kg. for 1,3-di(betaphenethyl)-2-streptomycyl-tetrahydroimidazole sulfate.

I claim:

1. The process of purifying streptomycin comprising reacting in alkaline solution streptomycin with a diamine selected from the group consisting of compounds having the formula

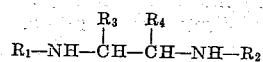

wherein $R_1$ and $R_2$ represent radicals selected from the group consisting of alkyl, cyclopentyl, cyclopentyl-lower alkyl, cyclohexyl, cyclohexyl-lower alkyl, lower alkyl-cyclohexyl-lower alkyl, lower alkoxy-cyclohexyl-lower alkyl, lower alkyl-cyclohexyl, lower alkoxy-cyclohexyl, dehydroabietyl, pyridyl, lower alkyl-pyridyl, thiophene-lower alkyl, lower alkyl-thiophene-lower alkyl, furan-lower alkyl, lower alkyl-furan-lower alkyl, quinolyl-lower alkyl, naphthyl, benzhydryl, piperonyl, thiazolyl, phenyl, lower alkyl-phenyl-lower alkyl, phenyl-lower alkyl, halophenyl-lower alkyl, nitrophenyl-lower alkyl, hydroxyphenyl-lower alkyl, $H_2N$-phenyl-lower alkyl, lower alkoxy-phenyl-lower alkyl, alkoxy-hydroxy-phenyl-lower alkyl, and di-lower alkyl-monohydroxy-phenyl-lower alkyl; $R_3$ and $R_4$ represent members selected from the group consisting of hydrogen and methyl, isolating the product so formed and regenerating purified streptomycin by hydrolyzing this product in an acid medium.

2. The process of purifying streptomycin comprising reacting in alkaline solution streptomycin with N,N'-dibenzylethylenediamine, isolating the product so formed and regenerating purified streptomycin by hydrolyzing this product in an acid medium.

3. The process of purifying an acid addition salt of streptomycin comprising reacting in alkaline solution an acid addition salt of streptomycin with N,N'-dibenzylethylenediamine, isolating the product so formed and regenerating said purified acid addition salt of streptomycin by hydrolyzing this product in an acid medium which is acidified with the same acid which forms said acid addition salt of streptomycin.

4. The process of purifying streptomycin sulfate comprising reacting, in alkaline solution, streptomycin sulfate with N,N'-dibenzylethylenediamine, isolating the product so formed and regenerating purified streptomycin sulfate by hydrolyzing this product in an acid medium which is acidified with sulfuric acid.

References Cited in the file of this patent

UNITED STATES PATENTS

| | | |
|---|---|---|
| 1,805,953 | Morton | May 19, 1931 |
| 2,490,393 | Whetstone et al. | Dec. 6, 1949 |
| 2,501,014 | Wintersteiner | Mar. 21, 1950 |
| 2,555,763 | Regna | June 5, 1951 |
| 2,560,889 | Regna | July 17, 1951 |
| 2,607,770 | Winsten | Aug. 19, 1952 |
| 2,627,491 | Szabo et al. | Feb. 3, 1953 |
| 2,657,171 | Macek | Oct. 27, 1953 |

OTHER REFERENCES

Alphen: Rec. Trav. Chim., volume 55 (1936), pages 669–674.